United States Patent
Nagata et al.

(10) Patent No.: US 8,054,051 B2
(45) Date of Patent: Nov. 8, 2011

(54) APPARATUS AND METHOD FOR DETECTING AN ABNORMALITY OF A GENERATOR FOR VEHICLES

(75) Inventors: Tadakazu Nagata, Okazaki (JP); Toshinori Maruyama, Anjo (JP)

(73) Assignee: Denso Corporation, Kariya (JP)

( * ) Notice: Subject to any disclaimer, the term of this patent is extended or adjusted under 35 U.S.C. 154(b) by 457 days.

(21) Appl. No.: 12/379,749

(22) Filed: Feb. 27, 2009

(65) Prior Publication Data
US 2009/0218992 A1    Sep. 3, 2009

(30) Foreign Application Priority Data
Mar. 3, 2008    (JP) .................. 2008-051803

(51) Int. Cl.
*H02K 11/00*    (2006.01)

(52) U.S. Cl. ............... 322/99; 322/24; 322/25; 322/28; 290/40 R; 307/10.1

(58) Field of Classification Search .............. 322/24, 322/25, 28, 99; 290/40 R; 307/10.1; *H02K 11/00*
See application file for complete search history.

(56) References Cited

U.S. PATENT DOCUMENTS

| | | | | |
|---|---|---|---|---|
| 4,665,354 A * | 5/1987 | Sada et al. | ...... | 320/123 |
| 6,750,634 B2 * | 6/2004 | Taniguchi et al. | ...... | 322/28 |
| 6,867,569 B2 * | 3/2005 | Taniguchi et al. | ...... | 322/28 |
| 7,235,952 B2 * | 6/2007 | Maehara | ...... | 322/24 |
| 7,285,937 B2 * | 10/2007 | Asada | ...... | 322/24 |
| 7,285,938 B2 * | 10/2007 | Aoyama | ...... | 322/28 |
| 7,292,007 B2 * | 11/2007 | Aoyama | ...... | 322/24 |
| 2003/0042874 A1 * | 3/2003 | Anderson et al. | ...... | 322/28 |
| 2007/0114976 A1 * | 5/2007 | Inokuchi et al. | ...... | 322/28 |
| 2009/0218992 A1 * | 9/2009 | Nagata et al. | ...... | 322/99 |

FOREIGN PATENT DOCUMENTS

JP    A-2003-061260    2/2003

* cited by examiner

*Primary Examiner* — Quyen Leung
*Assistant Examiner* — John K Kim
(74) *Attorney, Agent, or Firm* — Oliff & Berridge, PLC

(57) ABSTRACT

The present invention provides, as one aspect, an apparatus for detecting an abnormality of a generator for vehicles. The generator includes a multi-phase armature winding that has phase windings and a rectifier that rectifies multi-phase output of the armature winding. The apparatus includes a first period detection unit that detects a first period of an output voltage of the generator, a second period detection unit that detects a second period of an voltage of one of the phase windings, and an abnormality determination unit that determines presence or absence of an abnormality of the generator by comparing the first period with the second period.

10 Claims, 5 Drawing Sheets

500 μs/div

500 μs/div

APPARATUS AND METHOD FOR DETECTING AN ABNORMALITY OF A GENERATOR FOR VEHICLES

CROSS REFERENCE TO RELATED APPLICATION

This application is based on and claims the benefit of priority from earlier Japanese Patent Application No. 2008-51803 filed Mar. 3, 2008, the description of which is incorporated herein by reference.

BACKGROUND OF THE INVENTION

1. Technical field of the Invention

The present invention relates to an apparatus and a method for detecting an abnormality of a generator for vehicles.

2. Related Art

Conventionally, apparatuses are known which detect an abnormality of an alternator for vehicles. In one of these apparatuses, ripples are detected in the output voltage of a rectifier of an alternator. Then, the presence or absence of an abnormality of the alternator is determined based on the number of the ripples. Such an apparatus is disclosed, for example, in Japanese Patent Laid-open Publication No. 2003-61260.

However, the magnitude of the ripples varies in response to the output current and revolution speed of the alternator and the condition of a battery. Therefore, in the apparatus disclosed in Japanese Patent Laid-open Publication No. 2003-61260, there is a problem that it is difficult to accurately determine the presence or absence of an abnormality of the alternator based on the number of the ripples only. In addition, electric loads which are repeatedly and periodically connected and disconnected cause variations of the output voltage of the alternator. Consequently, the measurement error of the number of the ripples becomes large, thereby making it difficult to accurately determine the presence or absence of an abnormality of the alternator.

SUMMARY OF THE INVENTION

The present invention has been made in consideration of the foregoing conventional situation, and an object of the present invention is to provide an apparatus and a method for detecting an abnormality of a generator for vehicles, which determine the presence or absence of an abnormality of the generator even when the connection state of electric loads and the condition of a battery vary.

In order to achieve the object, the present invention provides, as one aspect, an apparatus for detecting an abnormality of a generator for vehicles, the generator including a multi-phase armature winding that has phase windings and a rectifier that rectifies multi-phase output of the armature winding, comprising: a first period detection unit that detects a first period of an output voltage of the generator; a second period detection unit that detects a second period of an voltage of one of the phase windings; and an abnormality determination unit that determines presence or absence of an abnormality of the generator by comparing the first period with the second period.

Specifically, the abnormality of the generator corresponds to an abnormality of the rectifier.

In addition, the first period detection unit calculates an autocorrelation between a first waveform of the output voltage and a second waveform obtained by delaying the first waveform and detects a time lag, at which a correlation value is maximized, as the first period.

In addition, the abnormality determination unit determines the presence of the abnormality when the first period agrees with the second period.

Furthermore, the apparatus further comprises a transmission unit that transmits a signal for indicating the abnormality.

DETAILED DESCRIPTION OF THE PREFERRED EMBODIMENTS

Figure 1:
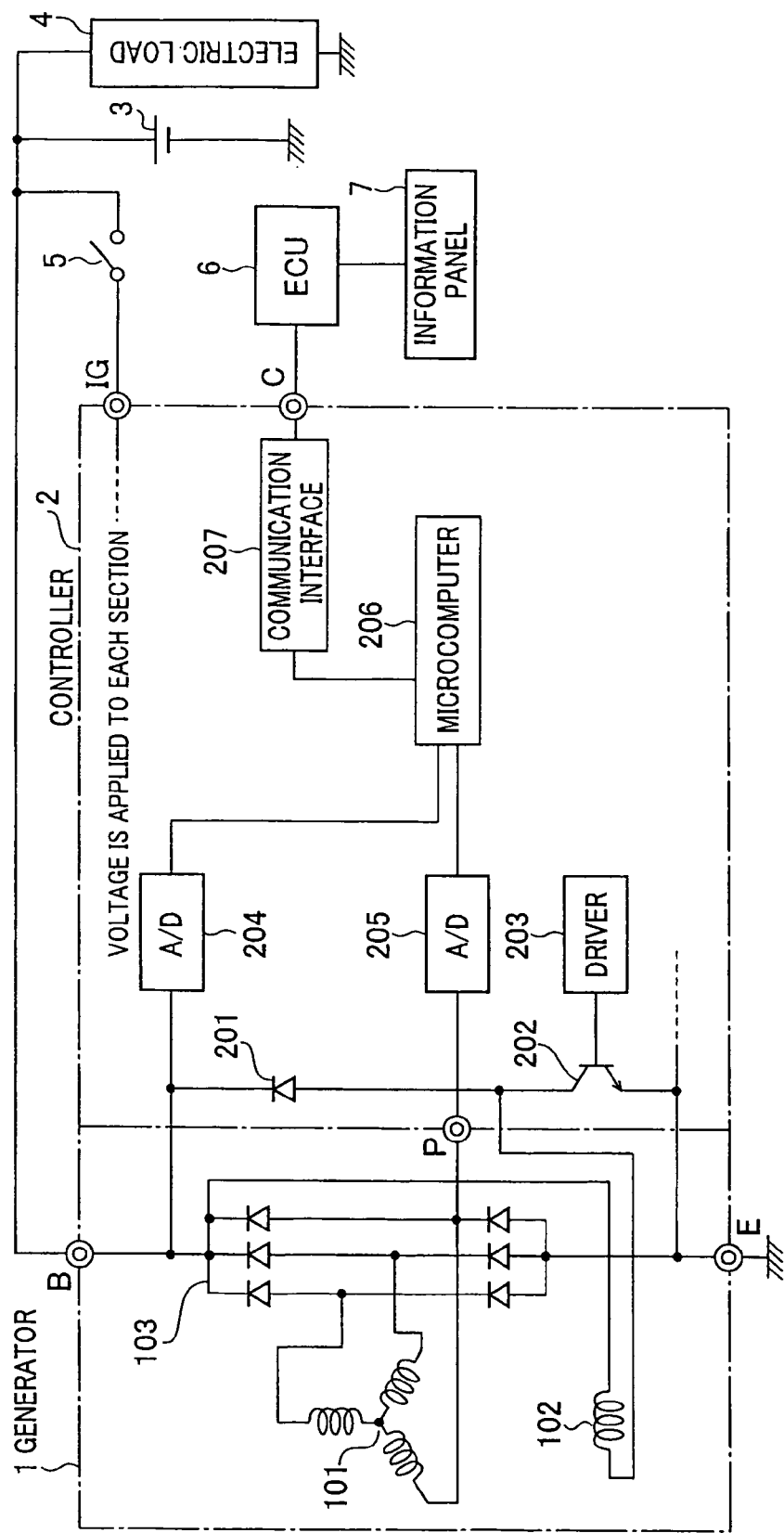
FIG. 1 is a diagram showing a configuration of a generator for vehicles and a generation controller for the vehicles of an embodiment.

Hereinafter, a generator for vehicles and a generation controller for the vehicles to which an apparatus and a method for detecting an abnormality of a generator for vehicles of the present invention are applied will be described with reference to the accompanying drawings. FIG. 1 is a diagram showing a configuration of the generator for vehicles and the generation controller for the vehicles of an embodiment to which the present invention is applied. FIG. 1 further shows a connection state between the generation controller and an engine ECU (Electronic Control Unit), a battery and the like.

In FIG. 1, a generation controller 2 for vehicles controls the generation state of a generator 1 for the vehicles so that the voltage of an output terminal (which is called as "B terminal") of the generator 1 is regulated to a predetermined voltage. The generator 1 comprises a three-phase (multi-phase) armature winding 101 included in a stator, an exciting winding 102 included in a rotor, and a rectifier 103 for full-wave rectifying the three-phase (multi-phase) output of the armature winding 101. After a key switch 5 is turned to the ON position and the generation controller 2 starts, the generation controller 2 controls the output voltage of the generator 1. That is, the generation controller 2 intermittently controls the energization of the exciting winding 102 as appropriate. The B terminal of the generator 1 is connected to a battery 3 and an electric load 4. Charging current and operating current are supplied to the battery 3 and the electric load 4 via the B terminal. The generation controller 2 is connected to an engine ECU 6 via a communication terminal C. On receiving an abnormality detection signal form the generation controller 2, the engine ECU 6 gives an alarm indicating the occurrence of the abnormality on an information panel 7. For example, the alarm is given by turning on an indicator of the information panel 7.

Next, a detailed configuration and operations of the generation controller 2 will be described. As shown in FIG. 1, the generation controller 2 comprises a free-wheeling diode 201, an exciting drive transistor 202, a driver 203, an analog-digital converters (A/D) 204 and 205, a microcomputer 206, and a communication interface 207.

The exciting drive transistor 202 is electrically connected in series with the exciting winding 102. The exciting drive transistor 202 is a switching element which supplies exciting current to the exciting winding 102 when the exciting drive transistor 202 is in the ON state due to an inputted drive signal. The free-wheeling diode 201 is connected in parallel with the exciting winding 102. The free-wheeling diode 201 passes the exciting current when the exciting drive transistor 202 is in the OFF state. The driver 203 receives a drive signal and controls the exciting drive transistor 202 to be in the ON or OFF state.

The analog-digital converter 204 is connected to the B terminal. The analog-digital converter 204 converts the output voltage (B terminal voltage) of the generator 1 (a rectifier 103) into digital data (B terminal voltage data). The analog-digital converter 205 is connected to one of phase windings (P terminal) of the three-phase armature winding 101. The analog-digital converter 205 converts the phase voltage (P terminal voltage) of the phase winding into digital data (P terminal voltage data).

The microcomputer 206 executes an abnormality detection program stored in a memory (not shown) to detect an abnormality of the generator 1 (especially, the rectifier 103). In particular, the microcomputer 206 determines the presence or absence of an abnormality of the generator 1 based on the B terminal voltage data and the P terminal voltage data outputted from the two analog-digital converters 204 and 205. When the microcomputer 206 detects an abnormality of the generator 1, the microcomputer 206 outputs an abnormality detection signal for indicating the abnormality of the generator 1 to the communication interface 207. The communication interface 207 transmits the abnormality detection signal received from the microcomputer 206 to the engine ECU 6 via a communication terminal C.

The analog-digital converter 204 and the microcomputer 206 corresponds to a first period detection means (unit). The analog-digital converter 205 and the microcomputer 206 corresponds to a second period detection means (unit). The microcomputer 206 corresponds to an abnormality determination means (unit). The communication interface 207 corresponds to a transmission means (unit).

Figure 2:
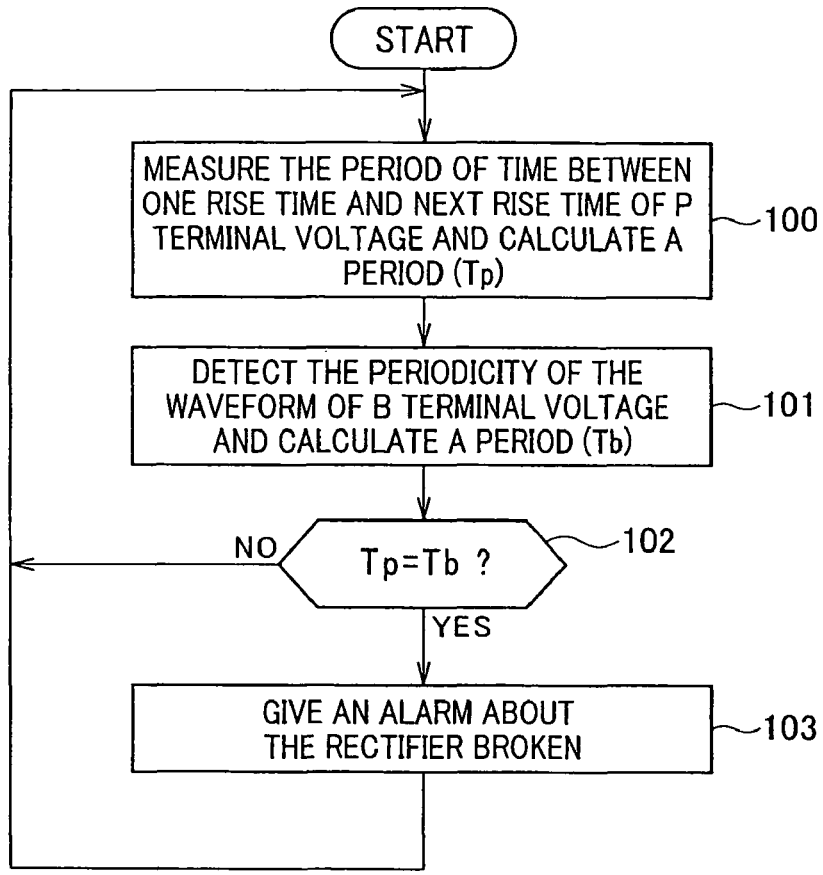
FIG. 2 is a flowchart showing a procedure of operations for detecting an abnormality and giving an alarm.

Next, operations for detecting an abnormality and giving an alarm will be described. FIG. 2 is a flowchart showing a procedure of the operations for detecting an abnormality and giving an alarm.

The microcomputer 206 measures the period of time between one rise time and the following rise time of the P terminal voltage based on the P terminal voltage data outputted from the analog-digital converter 205 and calculates a period Tp (step 100). Next, the microcomputer 206 detects the periodicity of the waveform of the B terminal voltage based on the B terminal voltage data outputted from the analog-digital converter 204 and calculates a period Tb (step 101). The steps 100 and 101 may be performed in reverse order or in parallel.

Next, the microcomputer 206 determines whether or not the period Tp calculated in the step 100 is equal to the period Tb calculated in the step 101 (step 102). When the microcomputer 206 determines that the period Tp is not equal to the period Tb (negative determination), the process returns to the step 100 and the calculation of the period Tp and the following operation are repeated. For example, in a case where the output voltage of the three-phase armature winding 101 is full-wave rectified by using the rectifier 103, the period Tp becomes six times the period Tb (see FIG. 5 described later) when the generator 1 operates normally. Therefore, the two periods do not agree with each other. The range in which the two periods are assumed to be agreed with each other is determined as appropriate.

On the other hand, when the microcomputer 206 determines that the period Tp is equal to the period Tb (positive determination) in the step 102, the microcomputer 206 outputs an abnormality detection signal indicating that the rectifier 103 is broken. Thereby, the engine ECU 6 gives an alarm (step 103).

Figure 3:
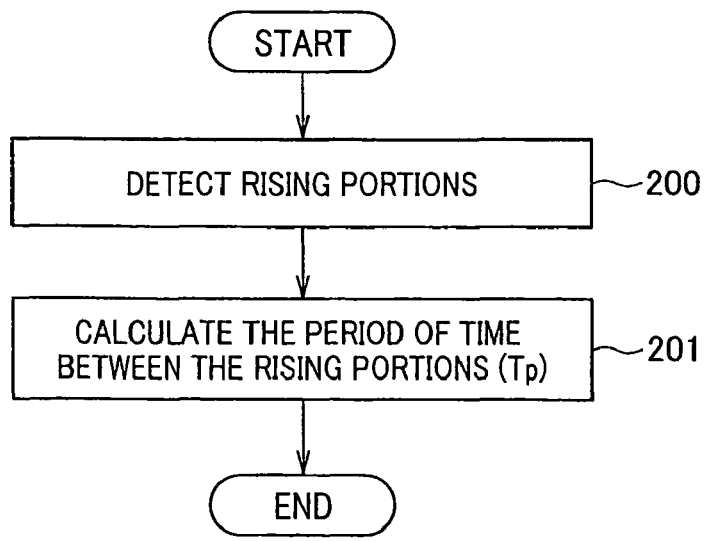
FIG. 3 is a flowchart showing a procedure of an operation for calculating period Tp performed in step 100 shown in FIG. 2.

FIG. 3 is a flowchart showing a procedure of the operation for calculating the period Tp performed in the step 100 shown in FIG. 2. The microcomputer 206 detects rising portions of the P terminal voltage based on the P terminal voltage data outputted from the analog-digital converter 205 (step 200). Thereby, plural rising portions are detected which appear as time elapses. Next, the microcomputer 206 calculates the period of time between the rising portions (the time interval between the two rising portions which are adjacent to each other on a time axis) (step 201). The result of this calculation is the period Tp.

Figure 4:
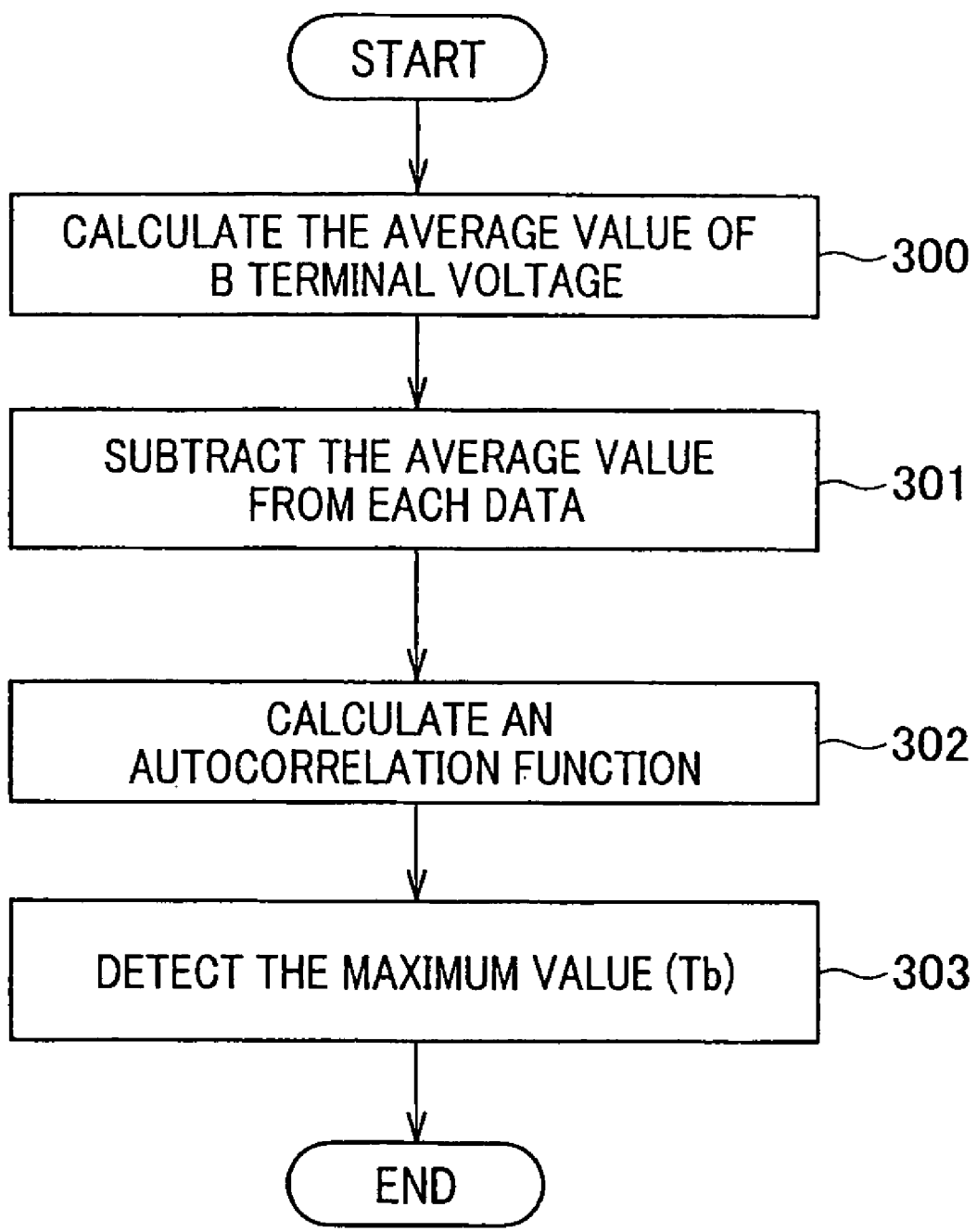
FIG. 4 is a flowchart showing an operation procedure for calculating period Tb performed in step 101 shown in FIG. 2.

FIG. 4 is a flowchart showing an operation procedure for calculating the period Tb performed in the step 101 shown in FIG. 2. The microcomputer 206 calculates the average value of the B terminal voltage based on the B terminal voltage data outputted from the analog-digital converter 204 (step 300). For example, the average value is calculated with respect to the B terminal voltage data whose amount (range) is an integral multiple of the period Tp. Next, the microcomputer 206 subtracts the calculated average value from each B terminal voltage data (step 301). Then, the microcomputer 206 calculates an autocorrelation function from each data from which the average value has been subtracted (step 302). The microcomputer 206 detects the maximum value of the function value (correlation value) and sets the time deviation corresponding to the maximum value to the period Tb (step 303). In an actual calculation of a correlation, an autocorrelation is calculated between a first waveform of the B terminal voltage from which the average value is subtracted and a second waveform obtained by delaying the first waveform, thereby detecting a time lag, at which the correlation value is maximized, as the period Tb. The range of the time lag in which the maximized correlation value is detected corresponds to the range after the time lag at which the value of the autocorrelation function becomes less than zero for the first time.

Figure 5:
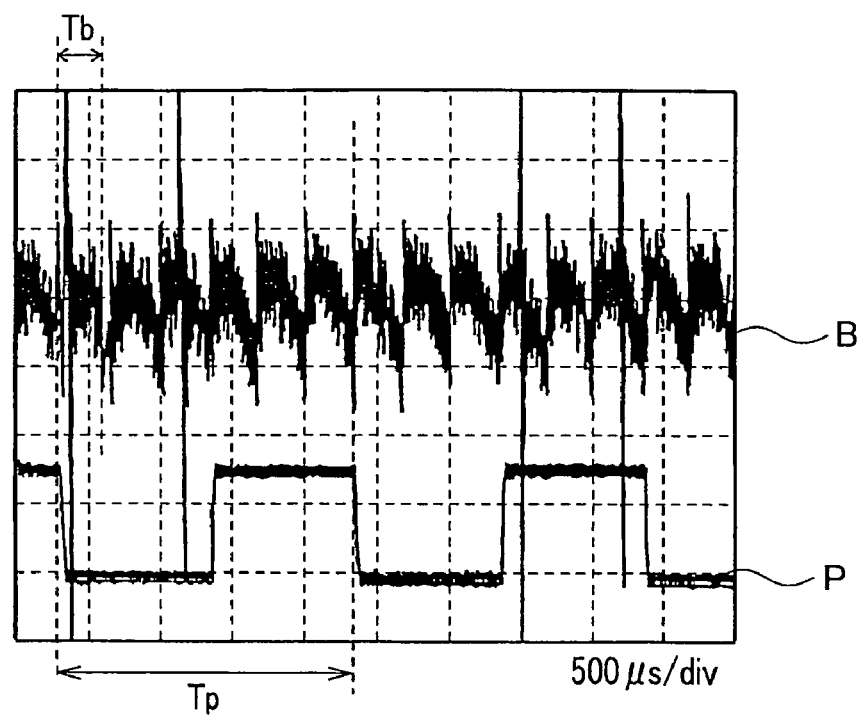
FIG. 5 is a diagram showing a waveform of P terminal voltage and a waveform of B terminal voltage obtained when a rectifier is not broken and the generator is in the normal state.

FIG. 5 is a diagram showing a waveform of the P terminal voltage and a waveform of the B terminal voltage obtained when the rectifier 103 is not broken and the generator 1 is in the normal state. The waveforms shown in FIG. 5 are results of actual observation. The horizontal axis is a time axis and is set to 500 μs/div. The vertical axis shows a voltage level. The vertical axis is set to 1 V/div for the B terminal voltage and 10 V/div for the P terminal voltage. The generator 1 is in an operation condition in which the load current is 20 A and the number of revolutions is 5000 rpm. This condition applies to the generator 1 having waveforms shown in FIGS. 6 to 8 described later. Note that, in FIGS. 5 to 8, "B" indicates a waveform of the B terminal voltage and "P" indicates a waveform of the P terminal voltage. As shown in FIG. 5, when the rectifier 103 is not broken, the period Tp is six times the period Tb. That is, the period Tp does not agree with the period Tb.

Figure 6:
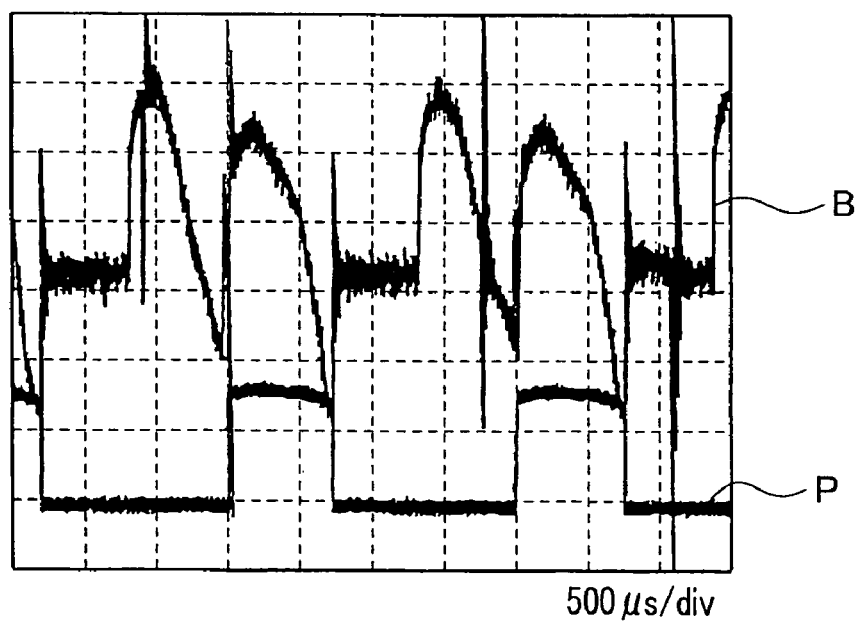
FIG. 6 is a diagram showing a waveform of P terminal voltage and a waveform of B terminal voltage obtained when a short fault is caused in the rectifier.
Figure 7:
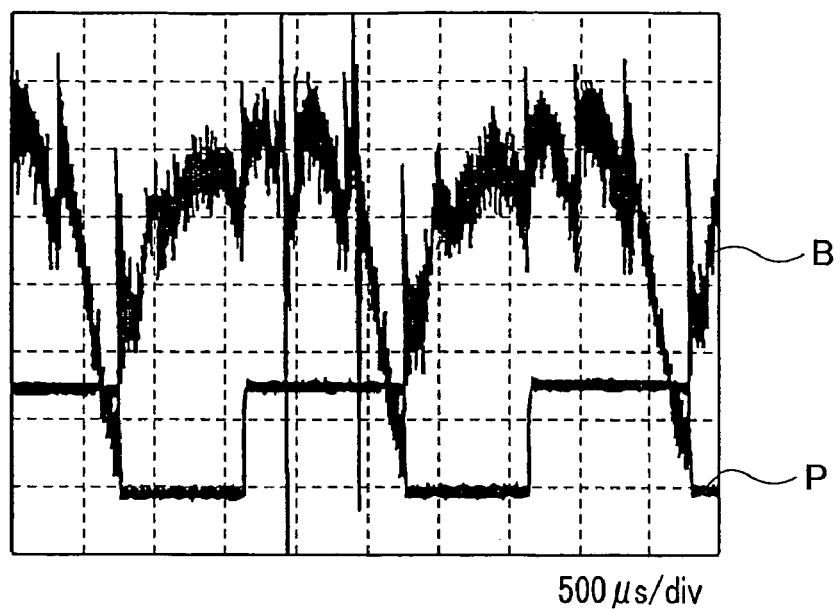
FIG. 7 is a diagram showing a waveform of P terminal voltage and a waveform of B terminal voltage obtained when an open fault is caused in the rectifier.
Figure 8:
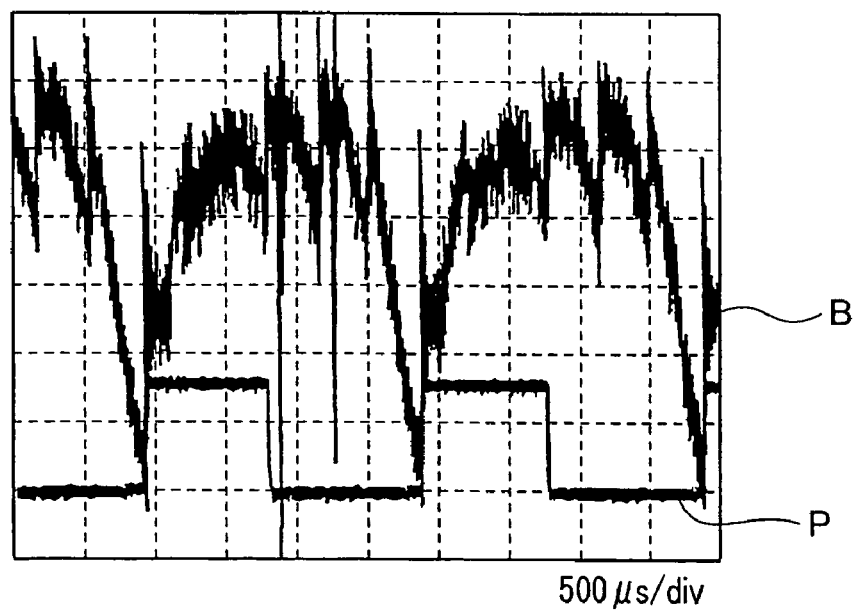
FIG. 8 is a diagram showing a waveform of P terminal voltage and a waveform of B terminal voltage obtained when an open fault is caused in the rectifier.

FIG. 6 is a diagram showing a waveform of the P terminal voltage and a waveform of the B terminal voltage obtained when a short fault is caused in the rectifier 103. The short fault makes a short circuit in a negative-electrode-side rectifier cell. FIG. 7 is a diagram showing a waveform of the P terminal voltage and a waveform of the B terminal voltage obtained when an open fault is caused in the rectifier 103. The open fault makes a positive-electrode-side rectifier cell nonconducting (i.e. an open state). FIG. 8 is a diagram showing a waveform of the P terminal voltage and a waveform of the B terminal voltage obtained when an open fault is caused in the rectifier 103. The open fault makes a negative-electrode-side rectifier cell nonconducting. As shown in FIGS. 7 and 8, when a rectifier cell included in the rectifier 103 is broken, the waveform of the B terminal voltage fluctuates compared with that in the normal state. Consequently, the periodicity of the waveform of the B terminal voltage varies, and the period of the waveform of the B terminal voltage becomes the same as that of the waveform of the P terminal voltage. This phenomenon is used in the present embodiment to determine that the rectifier 103 is broken when the period Tp agrees with the period Tb.

As described above, the generation controller 2 for vehicles, which is an apparatus for detecting an abnormality of a generator of the present embodiment, determines the presence or absence of an abnormality of the generator by comparing the period of the output voltage of the generator 1 with the period of the voltage of a phase winding thereof. Therefore, the presence or absence of an abnormality of the generator can be accurately determined even when the connection state of the electric load 4 and the condition of the battery 3 vary and the number of ripples included in the output voltage varies. Specifically, calculating an autocorrelation function of the waveform of the output voltage allows the period Tb to be accurately detected even when the outputted waveform varies in a complex manner when an abnormality occurs.

In the normal state, the ratio between two types of periods, the period Tb and the period Tp, is a value corresponding to the number of the phase of the armature winding. However, when an abnormality such as an open fault and a short fault occurs in a rectifier cell of the rectifier 103, the waveform of the output voltage of the generator 1 fluctuates. This is because the current flowing through the rectifier cell in which an abnormality is caused differs from the current flowing through the other rectifier cells. Consequently, the period Tb of the output voltage agrees with the period Tp of the voltage of a phase winding. Therefore, examining whether or not the period Tb agrees with the period Tp allows the presence or absence of an abnormality of the generator to be easily and accurately determined.

The present invention is not limited to the embodiment described above, but may be implemented with various modifications without departing from the spirit of the present invention. In the above-described embodiment, two types of periods Tb and Tp are compared with each other to determine the presence or absence of an abnormality of the generator. However, an auxiliary determination procedure may be added to reduce the processing load of detecting the period. For example, B terminal voltage data or average values thereof may be measured and stored at the period of a ripple of the B terminal voltage appearing in the normal state. In this case, only when the deviation from the data stored at a previous time exceeds a predetermined value, the operation procedure shown in FIG. 2 is performed. These procedures are performed by the microcomputer 206. Consequently, the processing load of the microcomputer 206 can be reduced.

In the above-described embodiment, the operation procedures shown in FIGS. 2 to 4 are performed by using the microcomputer 206. However, the same operation procedures may be performed by using a piece of hardware in which logic circuits and the like are combined.

It will be appreciated that the present invention is not limited to the configurations described above, but any and all modifications, variations or equivalents, which may occur to those who are skilled in the art, should be considered to fall within the scope of the present invention.

What is claimed is:

1. An apparatus for detecting an abnormality of a generator for vehicles, the generator including a multi-phase armature winding that has phase windings and a rectifier that rectifies multi-phase output of the armature winding, comprising:
   a first period detection unit that detects a first period of an output voltage of the generator;
   a second period detection unit that detects a second period of a voltage of one of the phase windings; and
   an abnormality determination unit that determines presence or absence of an abnormality of the generator by comparing the first period with the second period.

2. The apparatus according to claim 1, wherein the abnormality of the generator corresponds to an abnormality of the rectifier.

3. The apparatus according to claim 1, wherein the first period detection unit calculates an autocorrelation between a first waveform of the output voltage and a second waveform obtained by delaying the first waveform and detects a time lag, at which a correlation value is maximized, as the first period.

4. The apparatus according to claim 1, wherein the abnormality determination unit determines the presence of the abnormality when the first period agrees with the second period.

5. The apparatus according to claim 1, further comprising a transmission unit that transmits a signal for indicating the abnormality.

6. A method for detecting an abnormality of a generator for vehicles, the generator including a multi-phase armature winding that has phase windings and a rectifier that rectifies multi-phase output of the armature winding, comprising:
   detecting a first period of an output voltage of the generator;
   detecting a second period of a voltage of one of the phase windings; and
   determining presence or absence of an abnormality of the generator by comparing the first period with the second period.

7. The method according to claim 6, wherein the abnormality of the generator corresponds to an abnormality of the rectifier.

8. The method according to claim 6, wherein the detecting a first period includes:
   calculating an autocorrelation between a first waveform of the output voltage and a second waveform obtained by delaying the first waveform; and
   detecting a time lag, at which a correlation value is maximized, as the first period.

9. The method according to claim 6, wherein the presence of the abnormality is determined when the first period agrees with the second period.

10. The method according to claim 6, further comprising transmitting a signal for indicating the abnormality.

* * * * *